Feb. 11, 1941. B. F. CONNER 2,231,112
EYECUP
Filed Feb. 5, 1937. 2 Sheets-Sheet 1

Inventor
Benjamin F. Conner
By S. Jay Teller
Attorney

Feb. 11, 1941.    B. F. CONNER    2,231,112
EYECUP
Filed Feb. 5, 1937    2 Sheets-Sheet 2

Inventor
Benjamin F. Conner
By S. Jay Teller
Attorney

Patented Feb. 11, 1941

2,231,112

UNITED STATES PATENT OFFICE 2,231,112

EYECUP

Benjamin F. Conner, West Hartford, Conn., assignor to Colt's Patent Fire Arms Manufacturing Company, Hartford, Conn., a corporation of Connecticut Application February 5, 1937, Serial No. 124,290

8 Claims. (Cl. 128—249)

One object of this invention is to provide a composite article of manufacture, and more particularly an eyecup, having such structural details that the several parts thereof may be formed by a molding process and may be quickly and correctly assembled.

Another object is to provide an eyecup with a cover member for preventing contamination of the cup when not in use, and more particularly a cover member which is frictionally held in place by contact with the eyecup.

Another object is to provide the parts of a molded composite article of manufacture with cooperating means of such a nature that the parts may be assembled and held in fixed relationship without the use of cement irrespective of any difference in shrinkage of these parts.

A still further object is to provide a composite molded container closure construction which includes as a part thereof a molded eyecup bowl which may be readily secured to the cap portion of the closure.

Other objects and advantages of the invention will be apparent to those skilled in the art from the following description.

In the accompanying drawings I have shown several embodiments of the invention, but it will be understood that the drawings are intended for illustrative purposes only and are not to be construed as defining or limiting the scope of the invention, the claims forming a part of this specification being relied upon for that purpose.

Figure 1:
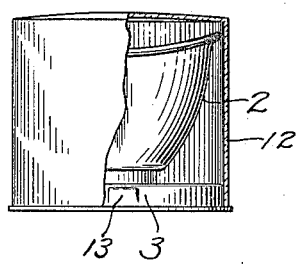
Fig. 1 is a side view of an eyecup and cover member made in accordance with the principles of one phase of the invention, the cover member being shown in place with a portion thereof broken away.

For the purpose of this specification I have illustrated several eyecup constructions in which are embodied the principles of my invention, although it should be understood that certain phases of the invention are susceptible of application to other articles.

I preferably form my eyecup from a synthetic resin composition. This material permits the cup to be made light in weight which feature is very desirable not only from the standpoint of actual weight but also in order to reduce the absorption of heat by the cup when in use. It is often desirable to use a heated solution for washing the eyes and, as only a small quantity is placed in the cup at one time, the cup should not have a sufficient mass to substantially reduce the temperature of the solution by absorbing the heat therefrom. The bowl is preferably molded from a synthetic resin material which is highly resistant to chemical action and to moisture absorption and the base member may be molded from a less expensive synthetic resin material which may be less resistant to chemical action and moisture absorption. Furthermore, a cup made from a synthetic resin composition may be made in attractive colors and pleasing color contrasts may be effected by forming the several parts of different colors. Among other advantages arising from the use of this material is the one of relative non-breakability.

It would require complicated and costly molds to form the cup as an integral unit and consequently, in order to reduce the cost of manufacture, I preferably form separate bowl and base members which are thereafter suitably connected together.

In Figs. 1 to 6 one phase of the invention is illustrated and an eyecup is generally indicated at 1 which includes a bowl member 2 of usual configuration having an elliptical or non-circular horizontal cross section, and a base member 3 of similar non-circular contour.

As the two members 2 and 3 are non-circular in cross section they should be properly positioned with respect to each other when assembled in order not to adversely affect the symmetry of the completed cup and for other reasons which will be set forth hereinafter. When the bowl and base members are formed separately one method of assuring their proper positional relationship when assembled is to provide a non-circular recess in one member into which a complemental portion of the other member may be received only when the two members are properly positioned relative to each other, or in other words, the two members include interengaging positioning portions.

While there may be variations as to specific details of construction, in the form illustrated in Figs. 1 to 6 the bowl member 2 includes on the bottom thereof the flange 4, the periphery of which is serrated as shown at 5 and has lugs 6 formed thereon, the flange thus constituting a portion of non-circular horizontal cross section. When the bowl member includes the described flange construction, the base member is preferably provided with an upstanding flange 7, the internal periphery of which is serrated as shown at 8 and offset at 9 to form a recess which is complementary to the flange 4 on the bowl member. The base member also preferably includes a depending vertical flange 10 with a horizontal flange 11 on the periphery thereof.

It will be readily seen that the bowl member may be assembled with the base member only when the two are properly positioned with respect to each other in predetermined relationship, that is, with their respective transverse major axes lying in the same vertical plane. The dimensions of the flanges 4 and 7 may be such that they frictionally engage each other, or such as to provide space for cement. In either case the interengaging serrations serve to provide increased securing surface areas.

Alternative constructions embodying the principles of this phase of my invention will be apparent to those skilled in this art but I have illustrated a telescoped flange construction rather than a construction in which the flanges are omitted and a portion of the bowl member per se, as distinguished from a flange or equivalent means projecting therefrom, is positioned in a complementary recess in the base member, or a construction wherein a plurality of projections is provided on the bottom of the bowl member which are adapted to project into recesses in the base member below the plane of the top surface thereof. The telescoping flange construction gives rise to a stem effect which enhances the appearance of the cup.

In accordance with another phase of the invention, I provide a cover to prevent contamination of the cup when not in use. For this purpose I have shown an inverted cup shaped cover 12 which may be placed over the cup. The dimensions of the cover are such that it snugly engages the periphery of the vertical flange 10 on the base member to be frictionally held in place thereby. The flange 10 and the cover 12 may, if desired, be provided with cooperating means, such as the lugs 13 and 14, for additionally holding the cover in place. The lugs 13 and 14 are exaggerated in size for convenience of illustration. The previously mentioned peripheral flange 11 serves to limit the downward movement of the cover so that it cannot be jammed down far enough to break the bowl. Attention is called to the fact that when a cover such as shown is used, it is doubly essential that the bowl and base members be properly positioned with respect to each other, for if they were not, the cover would not properly fit over both the bowl and base members.

Figure 2:
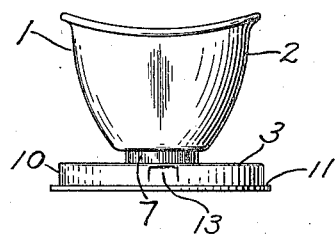
Fig. 2 is a side view of the eyecup.
Figure 3:
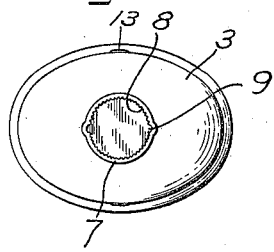
Fig. 3 is a top plan view of the base member prior to its assembly with the bowl member.
Figure 4:
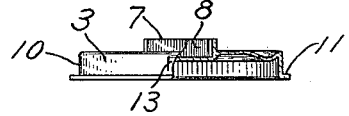
Fig. 4 is a side view, partly in section, of the base member shown in Fig. 3.
Figure 5:
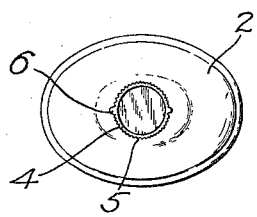
Fig. 5 is a bottom plan view of the bowl member prior to its assembly with the base member.
Figure 6:
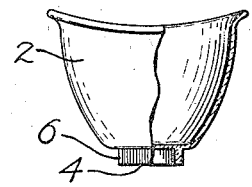
Fig. 6 is a side view, partly in section, of the bowl member shown in Fig. 5.
Figure 7:
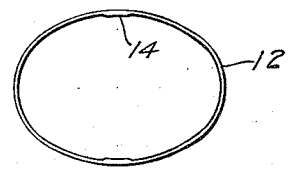
Fig. 7 is a bottom plan view of the cover member.
Figure 8:
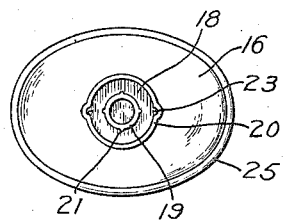
Fig. 8 is a top plan view of a base member including an alternative construction.
Figure 9:
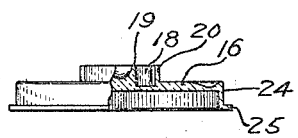
Fig. 9 is a side view of the base member shown in Fig. 8, a part thereof being broken away.
Figure 10:
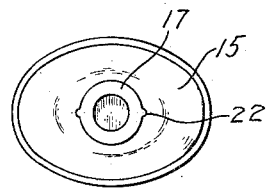
Figs. 10 and 11 are bottom and side views, respectively, of a bowl member which is adapted to be assembled with the base member of Figs. 8 and 9.
Figure 11:
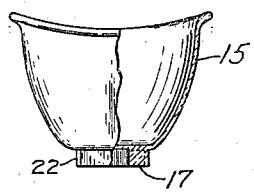

In Figs. 8 to 11 I have shown a composite article of the same general character as shown in Figs. 1 and 2 but having interconnecting means which incorporate the principles of another phase of my invention. In this embodiment the construction is such as to assure a frictional engagement between the bowl and base members irrespective of any difference in shrinkage of these parts. Molded bowl and base members, 15 and 16, generally similar to those shown in Figs. 1 to 6 are provided. One of these members, preferably the bowl member, is provided with means 17 in the form of an endless and substantially annular flange projecting therefrom, but I do not intend to limit myself to either an endless or substantially annular flange as other equivalent means may be substituted. The other member, that is the base member if the means is formed on the bowl member, is provided with a trough-like and substantially annular recess 18 which is adapted to receive the means 17 on the bowl member. In the form illustrated, the flanges 19 and 20 form the side walls of the recess and one or more projections 21 are provided on one of the side walls so as to extend into the recess.

The inner diameters of the flange 17 and the recess 18 are so related that the projections 21 will normally tend to dig into the flange 17, when the parts are assembled. If the member bearing the flange 17 shrinks more than a normal amount the projections 21 will tend to dig in more than normally while if the member bearing the projections shrinks more, they will dig in less than normally. In either case there will be a secure frictional engagement to hold the members assembled when forced together. The flange 20 is not strictly essential but is preferably included as it tends to substantially prevent any relative rocking movement of the bowl and base members which might break them, and it also improves the appearance of the assemblage.

The cup and base members are preferably provided with positioning lugs 22 and recesses 23 similar to those shown in the form illustrated in Figs. 1 to 6, these lugs and recesses rendering the flange 17 and recess 18 non-annular to thus adapt them for positioning purposes. The base member is also provided with the flanges 24 and 25 for cooperating with a cover such as shown at 12 in Fig. 1.

Figure 12:
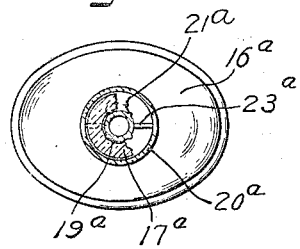
Fig. 12 is a horizontal sectional view taken through the interengaging portions of the bowl and base members in assembled relationship, this view showing an alternative detail of construction.

Fig. 12 illustrates the fact that the positioning lugs and recesses for assuring assembly in proper relationship may be located at the bottoms of the members instead of at the sides. The construction is otherwise similar to that already described in detail in Figs. 8 to 11. As shown in Fig. 12, the flange 20ª of the base 16ª is continuous, there being no recess such as 23. Formed on the bottom of the base member between the flanges 19ª and 20ª are two radial ribs 23ª, 23ª. The projections 21ª are differently located so as to be spaced from the ribs 23ª. The downward projecting flange 17ª of the bowl member is cylindrical in outline, there being no lugs such as 22 thereon. However, the said downward projecting flange 17ª is formed with two radial grooves adapted to receive and fit the upward projecting ribs 23ª on the base member. Thus the said ribs 23ª and the corresponding grooves in the bottom portion of the bowl member serve the same purpose as the described lugs 22 and recesses 23 even though the flange 17ª and its cooperating recess in the base are substantially annular, and they maintain the bowl member and the base member in proper assembled relationship. The grooves in the bottom portion of the bowl member are not shown in Fig. 12 but they are shown at 22ª in Figs. 13 and 15.

The base member of the eyecup or other article of manufacture may be so formed as to also constitute the closure for a bottle or other container. Eye wash solution is sold in containers, and more particularly in bottles, and prior to my invention closures for these containers have been provided which include a cap member having an aperture in the top thereof through which the stem of a glass eyecup bowl projects. This prior art construction was not only relatively expensive but increased the cost of applying the closures to the containers and packaging the resultant article. It is apparent that the bowl had to be secured to the cap before the latter was applied to the container in order to properly seal the stem of the bowl in the cap. A pre-assembled cap and bowl could not be automatically applied to the container by ordinary closure applying machines and in fact, it was found to be more expedient to apply the closures by hand. The prior art closure presented still another and more serious problem. The containers used are ordinarily of a rectangular or elliptical or other non-circular horizontal cross section and therefore have major and minor transverse axes and, as the eyecup bowls are of non-circular horizontal cross section, they too have major and minor transverse axes. It is obvious that if the assembled containers and closures are to present a symmetrical appearance and if the packaging cartons for the same are to be of uniform and minimum size, the transverse major axes of the container and bowl must lie in the same plane. With the pre-assembled cap and bowl of the prior art there could be no assurance that this planar relationship of transverse major axes would be present when the closure was screwed onto the container. I have provided a combined container cap and bowl which eliminates the shortcomings of the prior art structure above outlined. A closure incorporating the principles of this phase of my invention is of such configuration that it may be applied to a container by an ordinary automatic container closure applying machine and it also has an imperforate top to which an eyecup bowl may be readily secured in any desired position.

Figure 13:
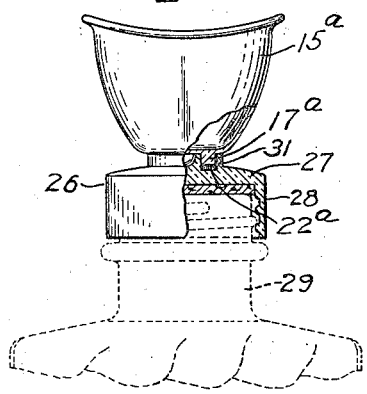
Fig. 13 is a side view of a container closure illustrating another phase of the invention, certain parts thereof being broken away.
Figure 14:
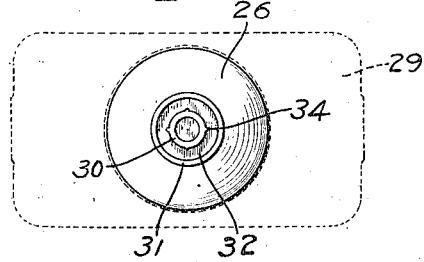
Fig. 14 is a top plan view of the construction shown in Fig. 13, but with the bowl member omitted.
Figure 15:
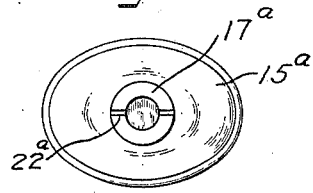
Fig. 15 is a bottom plan view of the bowl member shown in Fig. 13.

Referring now to Figs. 13, 14 and 15, I have shown a base member in the form of a closure or cap member 26 which has an imperforate top portion 27 and which is preferably provided with a depending internally screw threaded flange 28 adapted to engage the threaded neck of a bottle 29. A bowl member is indicated at 15ª which is adapted to be secured to the cap, this bowl member being also adapted for use with the base 16ª as shown in Fig. 12. The cap and bowl members are preferably molded from a composition of the synthetic resin class.

The cap member 26 is provided with flanges 30 and 31 which form an annular recess 32, while the bowl member has formed thereon an annular flange 17ª which is adapted to frictionally engage one or more projections 34 on one side wall of the recess 32 in the manner of the phase of the invention illustrated in Figs. 8 to 12. It should be noted that in the now preferred form of this phase of the invention the base member or cap 26 has no recesses such as 23 or ribs such as 23ª for preventing the bowl member from turning. However, the bowl member may have grooves 22ª, 22ª therein as shown. These grooves have no function when the bowl member is used with the cap member 26, but they are adapted to cooperate with the ribs 23ª of the base member 16ª shown in Fig. 12. This simplifies manufacturing procedure and enables a single form of bowl member to be used either with the base member 16ª or with the cap member 26. Preferably no provision other than frictional engagement is made for holding the bowl and closure assembled so that the two are relatively rotatable upon application thereto of sufficient force to overcome the friction.

The method of applying my combined closure to a container is as follows: The container may be filled in any manner such as by an automatic filling machine, the cap 26 is then applied, preferably by an automatic machine, the capped container is then transferred to an operative who qualifies, that is, positions a bowl member relative to the container so that the transverse major axes of the two lie in the same plane and who then assembles the two by forcing the flange 17ª into the recess 32. As the flange 17ª and the recess 32 are both annular, the bowl member may be assembled with the cap in any necessary angular relationship to give the desired relationship of the major axes of the bowl member and container.

What I claim is:

1. An eyecup structure comprising in combination, a molded bowl member having a non-circular horizontal cross-section, and a molded base member having a non-circular horizontal cross-section, said members including interengaging portions for holding them in a predetermined positional relationship with their major transverse axes lying in a common plane.

2. An eyecup structure comprising in combination, a molded bowl member having a non-circular horizontal cross-section, and a molded base member having a non-circular horizontal cross section, one of said members including a non-circular projection positioned within a complementary recess in the other member whereby the two members are held in a predetermined position with respect to each other with their major transverse axes lying in a common plane.

3. An eyecup structure comprising in combination a bowl member molded from a material of the synthetic resin class, a base member also molded from a material of the synthetic resin class, one of said members having an endless trough-like recess therein with the side walls of the recess extending substantially vertically and with at least one projection extending into said recess from a side wall thereof, and an endless flange on the other said member positioned in said recess and frictionally held therein by said projection.

4. An eyecup structure comprising in combination, a bowl member molded from a material of the synthetic resin class, and a base member molded from a material of the synthetic resin class, one of said members having an annular recess therein with the side walls of the recess extending substantially vertically and the other of said members including an annular projecting flange positioned within said recess so as to tightly engage one side wall thereof for holding the members in assembled relationship.

5. An eyecup structure comprising in combination, a molded bowl member having a non-circular horizontal cross-section, a molded base member having a non-circular horizontal cross-section, one of said members having an annular recess therein and the other of said members including an annular projecting flange positioned within said recess so as to tightly engage one side wall thereof for holding the members in assembled relationship, and cooperating means at the bottom of said recess and on the end surface of said flange for relatively positioning the members with their major transverse axes in a common plane.

6. A composite article of manufacture comprising in combination, a molded imperforate bowl member having a non-circular horizontal cross-section, and a base member therefor adapted to be secured to a container and serve as a closure for said container, one of said members including a projection having a substantially circular horizontal cross sectional outline positioned within a substantially circular recess in the other member which is adapted to receive said projection irrespective of the horizontal angular relationship in which the members may be assembled and the side wall of which frictionally engages said projection for holding the members in assembled relationship.

7. A composite article of manufacture comprising in combination, a molded bowl member, and a molded base member therefor adapted to be secured to a container and serve as a closure for said container, one of said members including an annular projecting flange positioned within an annular recess in the other member which is adapted to receive said flange irrespective of the horizontal angular relationship in which the members may be assembled and to tightly engage one side wall of said flange for holding the members in assembled relationship.

8. In combination, an eyecup comprising a bowl portion and a peripherally shouldered base portion, said bowl and base portions being approximately elliptical in horizontal cross-section with their transverse major axes lying in a common plane and said base portion being of such size and shape that a line vertically projected from any part of its periphery will be outside of the bowl portion, and an inverted cup shaped cover approximately elliptical in cross-section positioned over the eyecup with the open end thereof engaged with the periphery of the base portion so as to resist relative upward movement, the said cover being engaged with the shoulder of the base portion to positively prevent relative downward movement.

BENJAMIN F. CONNER.